United States Patent
Inoue

(10) Patent No.: US 10,442,354 B2
(45) Date of Patent: Oct. 15, 2019

(54) AWARENESS SUPPORT DEVICE AND AWARENESS SUPPORT METHOD

(71) Applicant: TOYOTA JIDOSHA KABUSHIKI KAISHA, Toyota-shi, Aichi-ken (JP)

(72) Inventor: Atsushi Inoue, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/987,123

(22) Filed: May 23, 2018

(65) Prior Publication Data

US 2018/0354418 A1 Dec. 13, 2018

(30) Foreign Application Priority Data

Jun. 7, 2017 (JP) ................. 2017-112742

(51) Int. Cl.
*B60Q 9/00* (2006.01)
*B60W 40/08* (2012.01)

(52) U.S. Cl.
CPC ............... *B60Q 9/00* (2013.01); *B60W 40/08* (2013.01); *B60W 2040/0827* (2013.01)

(58) Field of Classification Search
CPC .......... B60Q 9/00; B60K 28/02; G08B 21/06; A61B 5/18
See application file for complete search history.

(56) References Cited

U.S. PATENT DOCUMENTS

| | | | |
|---|---|---|---|
| 9,884,628 B1 * | 2/2018 | Grant | B60W 40/08 |
| 2014/0231166 A1 * | 8/2014 | Miller | B60W 40/08 180/272 |

FOREIGN PATENT DOCUMENTS

| | | |
|---|---|---|
| JP | 2001-163080 A | 6/2001 |
| JP | 2008-225537 A | 9/2008 |

* cited by examiner

*Primary Examiner* — Ryan W Sherwin
(74) *Attorney, Agent, or Firm* — Oliff PLC

(57) ABSTRACT

An awareness support device includes: an awareness level reduction detection unit configured to detect a reduction in a driver's awareness level based on vehicle information on a vehicle driven by the driver; an awareness level recovery detection unit configured to detect a recovery from the reduction in the driver's awareness level based on the vehicle information; and an interaction processing unit configured to: start an output of an interactive voice used for interaction with the driver when the awareness level reduction detection unit detects the reduction in the driver's awareness level; and terminate the output of the interactive voice when the awareness level recovery detection unit detects the recovery from the reduction in the driver's awareness level.

4 Claims, 8 Drawing Sheets

FIG. 3A

| PREDETERMINED CAUTION-REQUIRED ACTION | SUBTRACTION POINT |
|---|---|
| SUDDEN BRAKING (ORDINARY ROAD) | -4 POINTS |
| SUDDEN BRAKING (WHEN TURNING RIGHT/LEFT) | -8 POINTS |
| SUDDEN STEERING | -4 POINTS |
| LANE DEPARTURE (ONCE) | -1 POINTS |
| FAILURE TO STOP AT STOP LINE | -8 POINTS |
| DRIVE IN WRONG DIRECTION | -10 POINTS |
| TRAVELING STRAIGHT AHEAD FOR 30 SECONDS OR MORE WITH RIGHT/LEFT TURN LAMP ON | -6 POINTS |
| TRAVELING FOR 30 SECONDS OR MORE WITH HAZARD LAMP ON | -6 POINTS |

FIG. 3B

| ELAPSED TIME FROM OCCURRENCE TIME | COEFFICIENT |
|---|---|
| 5 MINUTES ELAPSED | 0.9 |
| 8 MINUTES ELAPSED | 0.7 |
| 15 MINUTES ELAPSED | 0.5 |
| 30 MINUTES ELAPSED | 0.3 |
| 40 MINUTES ELAPSED | 0 |

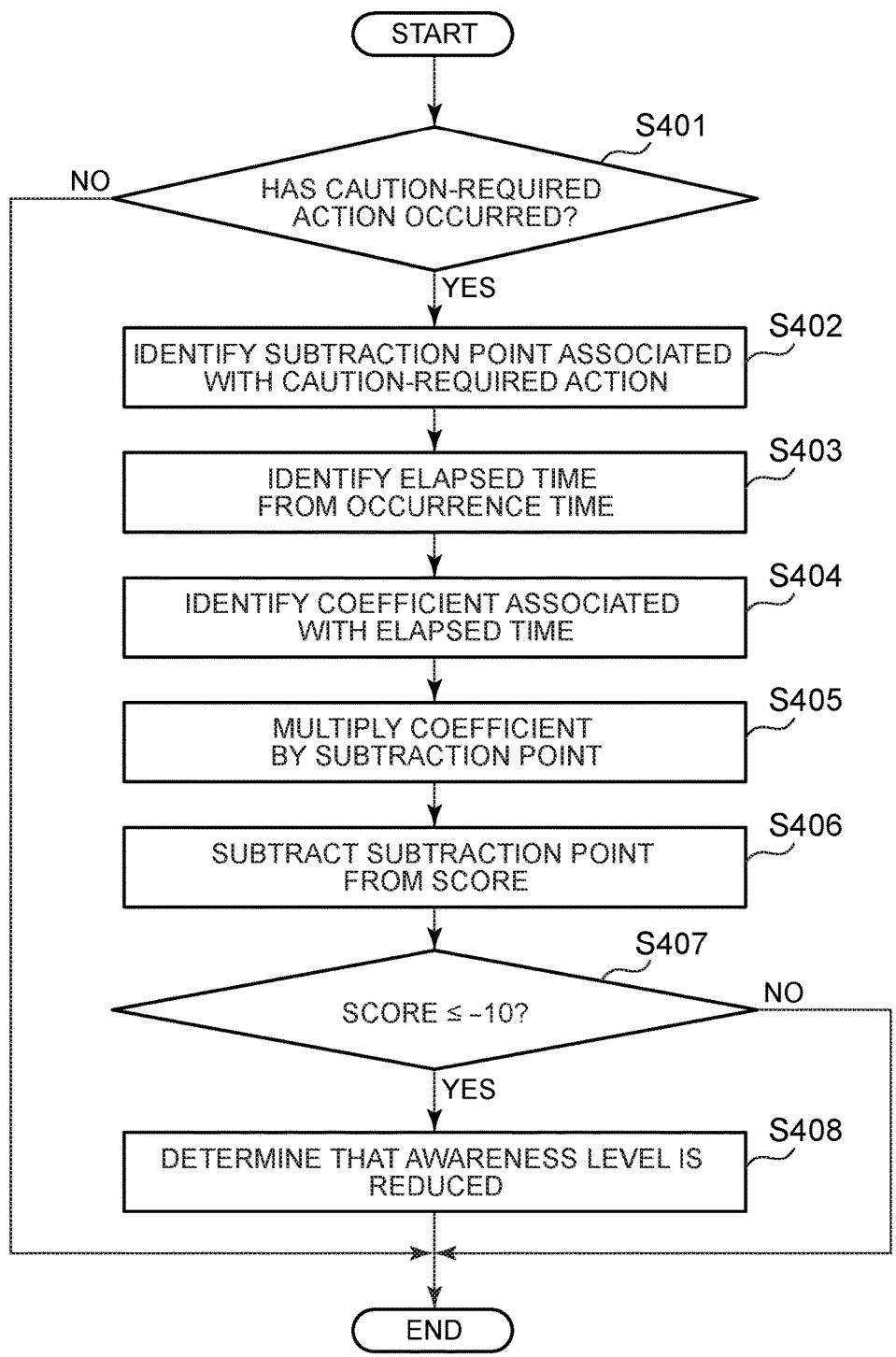

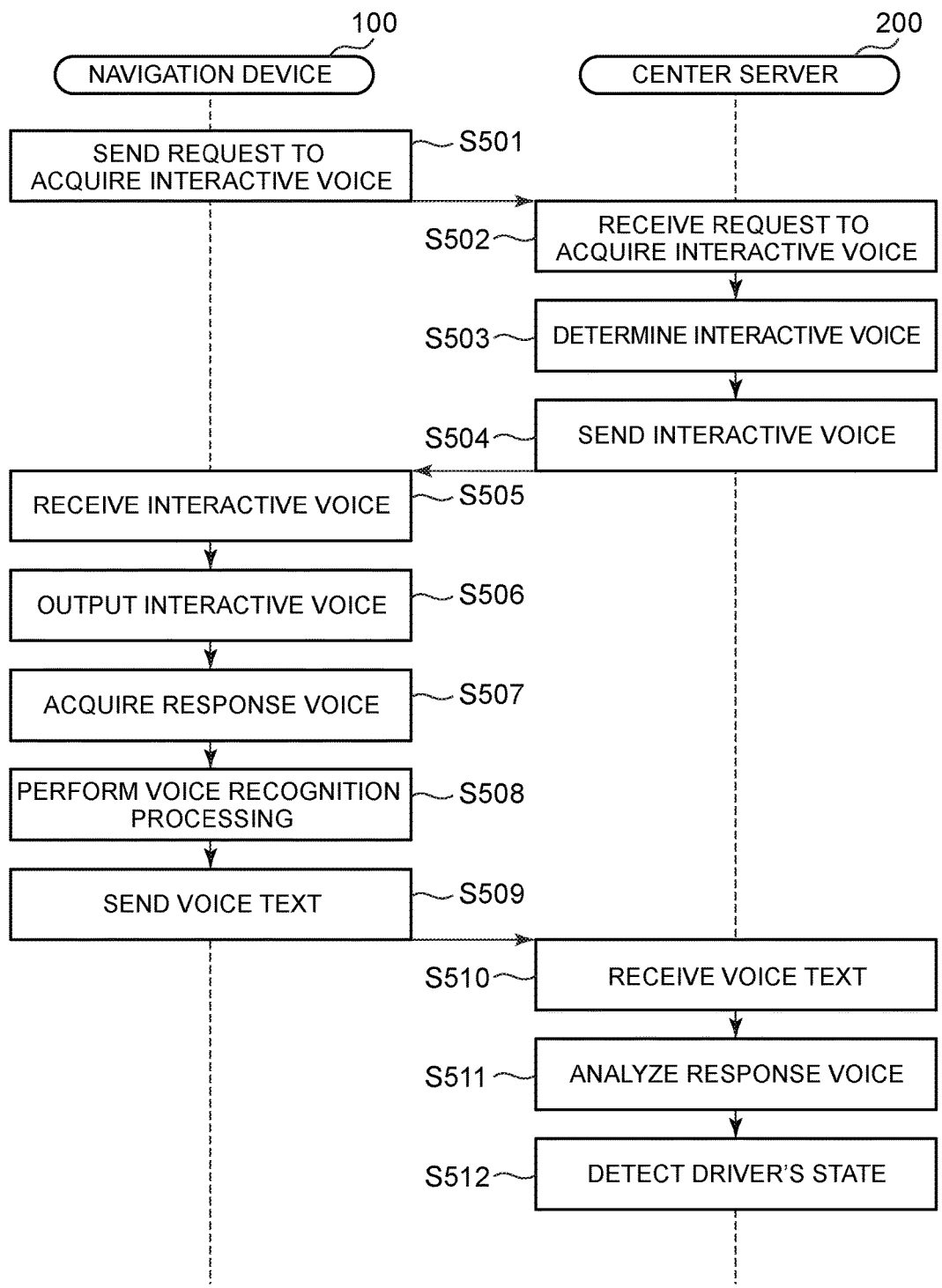

FIG. 7

| PREDETERMINED NORMAL ACTION | ADDITION POINT |
|---|---|
| SLOW DECELERATION | +1 POINT |
| NORMAL RIGHT/LEFT TURN WITH RIGHT/LEFT TURN LAMP ON | +1 POINT |
| NO LANE DEPARTURE FOR CERTAIN PERIOD | +1 POINT |

AWARENESS SUPPORT DEVICE AND AWARENESS SUPPORT METHOD

INCORPORATION BY REFERENCE

The disclosure of Japanese Patent Application No. 2017-112742 filed on Jun. 7, 2017 including the specification, drawings and abstract is incorporated herein by reference in its entirety.

BACKGROUND

1. Technical Field

The present disclosure relates to an awareness support device and an awareness support method.

2. Description of Related Art

As a related art, there is known a technology for alerting a driver by sound or light when it is detected that the driver is drowsy. One of such drowsiness warning devices is an in-vehicle drowsing warning device that sends a voice inquiry to a driver and, if a response from the driver is not detected for a predetermined time, detects that the driver is drowsy (that is, the awareness level is reduced).

For example, Japanese Patent Application Publication No. 2008-225537 (JP 2008-225537 A) discloses a technology that outputs voice question data from a speaker when the in-vehicle car navigation system is powered on and, if a microphone does not detect a voice within a predetermined time after the voice question data was output, detects that the driver is drowsy and then outputs an alarm from the speaker.

SUMMARY

However, the device according to the above-described technology, disclosed in Japanese Patent Application Publication No. 2008-225537 (JP 2008-225537 A), is configured in such a way that voice question data is repeatedly output at predetermined intervals after the in-vehicle car navigation system is powered on. That is, irrespective of whether the driver is actually drowsy or not, the voice question data is output from the speaker repeatedly. This repeated voice question data sometimes makes the driver feel annoying, leaving much room for improvement in the output timing of voice question data.

The present disclosure provides an awareness support device that allows the period during which an interaction with a driver is performed to be adjusted appropriately according to the driver's state.

An awareness support device according to a first aspect of the present disclosure includes: an awareness level reduction detection unit configured to detect a reduction in a driver's awareness level based on vehicle information on a vehicle driven by the driver, an awareness level recovery detection unit configured to detect a recovery from the reduction in the driver's awareness level based on the vehicle information; and an interaction processing unit configured to: start an output of an interactive voice used for interaction with the driver when the awareness level reduction detection unit detects the reduction in the driver's awareness level; and terminate the output of the interactive voice when the awareness level recovery detection unit detects the recovery from the reduction in the driver's awareness level.

An awareness support device according to a second aspect of the present disclosure includes: an Electronic Control Unit configured to detect a reduction in a driver's awareness level based on vehicle information on a vehicle driven by the driver, start an output of an interactive voice when the reduction in the driver's awareness level is detected, the interactive voice being a voice used for interaction with the driver; detect a recovery from the reduction in the driver's awareness level based on the vehicle information; and terminate the output of the interactive voice when the recovery from the reduction in the driver's awareness level is detected.

An awareness support method according to a third aspect of the present disclosure includes: detecting a reduction in a driver's awareness level based on vehicle information on a vehicle driven by the driver; starting an output of an interactive voice when the reduction in the driver's awareness level is detected, the interactive voice being a voice used for interaction with the driver; detecting a recovery from the reduction in the driver's awareness level based on the vehicle information; and terminating the output of the interactive voice when the recovery from the reduction in the driver's awareness level is detected.

This configuration allows the interaction with the driver to be performed while the driver's awareness level is actually reduced. Therefore, this configuration can appropriately adjust the period of interaction with the driver according to the driver's state.

In the aspect described above, the awareness level reduction detection unit may be configured to: subtract a point associated with a predetermined caution-required action from a score each time an occurrence of the predetermined caution-required action related to a travel of the vehicle is identified based on the vehicle information; and detect the reduction in the driver's awareness level when the score becomes equal to or less than a predetermined threshold value.

The aspect described above allows the interaction with the driver to be started when a predetermined caution-required action repeatedly occurs while the driver drives the vehicle. A predetermined caution-required action mentioned here can occur in the state in which the driver's awareness level is reduced. Therefore, the aspect described above can appropriately adjust the start timing of the interaction with the driver according to the driver's state.

In the aspect described above, the awareness level recovery detection unit may be configured to: add a point associated with a predetermined normal action to the score each time an occurrence of the predetermined normal action related to the travel of the vehicle is identified based on the vehicle information; and detect the recovery from the reduction in the driver's awareness level when the score becomes greater than a predetermined threshold value.

This aspect described above allows the interaction with the driver to be ended when a predetermined normal action repeatedly occurs while the driver drives the vehicle. A predetermined normal action mentioned here can occur in the state in which the driver's awareness level is recovered. Therefore, the aspect described above can appropriately adjust the end timing of the interaction with the driver according to the driver's state.

As described above, the awareness support device and the awareness support method can appropriately adjust the period of interaction with the driver according to the driver's state.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 3A is a diagram showing an example of a table referenced by the navigation device (awareness level reduction detection unit) according to the embodiment;

FIG. 3B is a diagram showing an example of a table referenced by the navigation device (awareness level reduction detection unit) according to the embodiment;

FIG. 4 is a flowchart showing a procedure of the detection processing performed by the navigation device (awareness level reduction detection unit) according to the embodiment;

FIG. 5 is a sequence diagram showing a procedure of the interaction processing performed by the navigation device and a center server according to the embodiment;

FIG. 7 is a diagram showing an example of a table referenced by the navigation device (awareness level recovery detection unit) according to the embodiment.

DETAILED DESCRIPTION OF EMBODIMENTS

An awareness support system in an embodiment of the present disclosure will be described in detail below with reference to the drawings.

(System Configuration of the Awareness Support System 10)

Figure 1:
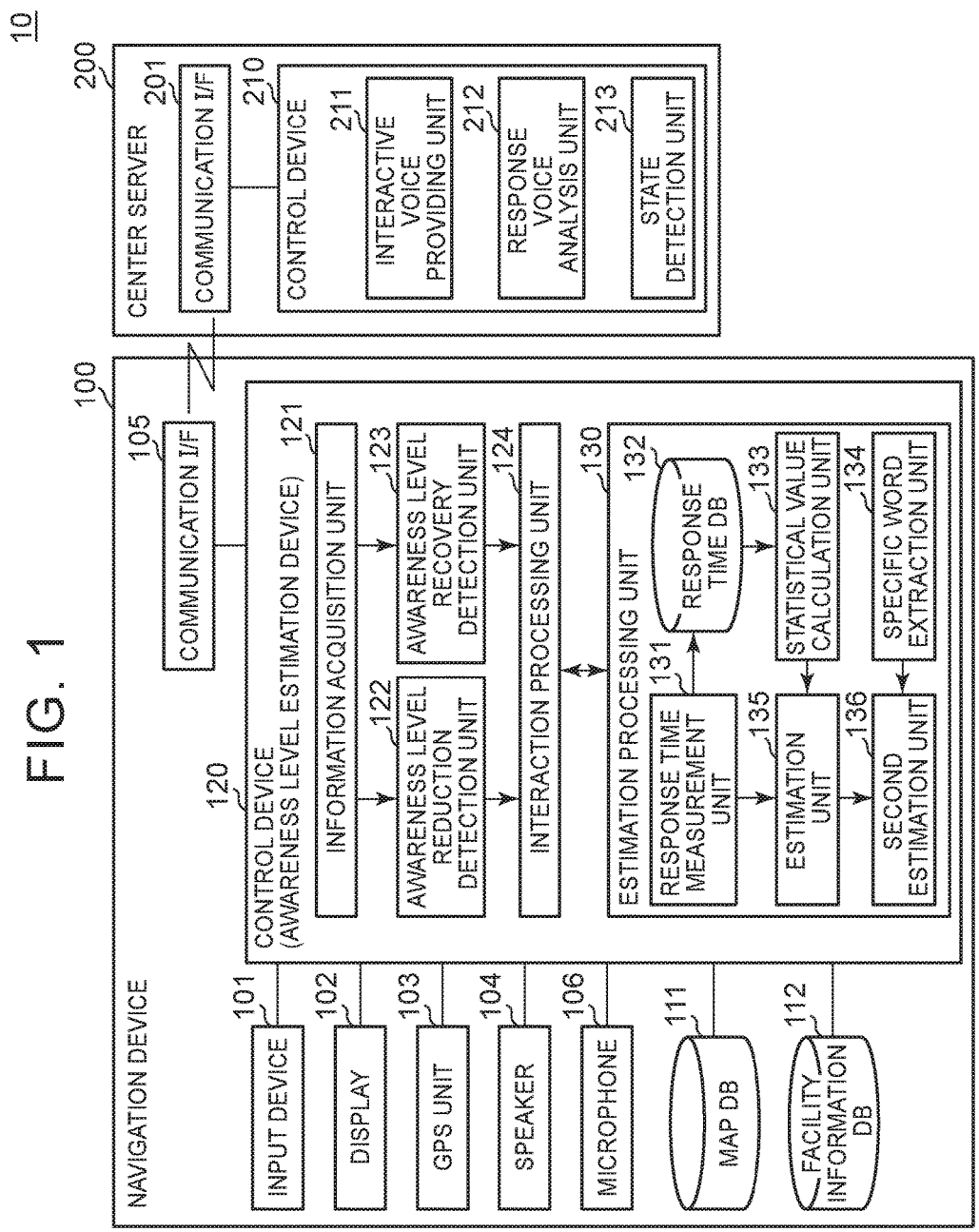
FIG. 1 is a diagram showing a system configuration of an awareness support system according to an embodiment.

FIG. 1 is a diagram showing a functional configuration of an awareness support system 10 according to the embodiment. The awareness support system 10 shown in FIG. 1 includes a navigation device 100 and a center server 200. This awareness support system 10 provides an awareness support service to the driver of a vehicle such as an automobile. The awareness support service refers to a service that, upon detecting a reduction in the driver's awareness level, outputs a question-form interactive voice to the driver, using the interaction service provided by the center server 200, to improve the driver's awareness level. Here, the driver's awareness level is an index representing how clear the driver's conscious is. In particular, the awareness support service in this embodiment can estimate the driver's awareness level accurately through an interaction with the driver. The driver's awareness level, which is estimated by the awareness support service, is output, for example, to various processing units provided in the vehicle (for example, a processing unit for advising the driver to take a break based on the awareness level, a processing unit for logging the awareness level, etc.).

(Center Server 200)

The center server 200 is a device that provides the interaction service to the navigation device 100 when the navigation device 100 uses the awareness support service. The interaction service refers to a service that provides interactive voice data, which represents an interactive voice for the driver, to the navigation device 100.

The center server 200 is installed in facilities outside the vehicle (for example, in the facilities managed by the provider of the interaction service). The center server 200 can send and receive various types of data (for example, the interactive voice data, response voice data, etc.) to and from the navigation device 100 via wireless communication with the navigation device 100 (for example, Wi-Fi (registered trademark)).

As shown in FIG. 1, the center server 200 includes a communication interface (I/F) 201 and a control device 210.

The communication I/F 201 controls wireless communication with the navigation device 100 to send and receive various type of data to and from the navigation device 100. For example, the communication I/F 201 receives a request to acquire interactive voice data for the driver from the navigation device 100. The communication IF 201 also sends interactive voice data for the driver, provided by an interactive voice providing unit 211, to the navigation device 100. The communication I/F 201 also receives voice recognition result data (voice text) on a driver's response voice from the navigation device 100.

The control device 210 is a device that provides the interaction service to the navigation device 100. As shown in FIG. 1, the control device 210 functionally includes the interactive voice providing unit 211, a response voice analysis unit 212, and a state detection unit 213.

The interactive voice providing unit 211 provides interactive voice data for the driver to the navigation device 100 when the communication I/F 201 receives a request to acquire an interactive voice for the driver. For example, the interactive voice providing unit 211 may provide the following two types of interactive voice data: one is interactive voice data of a first interactive voice group composed of interactive voice data that requires a response whose response time is assumed to be relatively short and the other is interactive voice data of a second interactive voice group composed of interactive voice data that requires a response whose response time is assumed to be relatively long.

<Example of Interactive Voice Data of the First Interactive Voice Group>

"Would you like to talk with me for a while?"

"There is a traffic jam ahead. Do you want to search for a detour route?"

"The fuel is running low. Do you want to search for a place where you can refuel your vehicle?"

<Example of Interactive Voice Data of the Second Interactive Voice Group>

"What did you have for lunch today?"

"What was the most recent movie you saw?"

"If you are going on a trip, where do you want to go?"

When the recognition result data (voice text) of a driver's response voice is received by the communication I/F 201, the response voice analysis unit 212 analyzes the driver's response voice based on the recognition result data. More specifically, the response voice analysis unit 212 performs known syntax analysis processing and known intention understanding processing (specific word extraction processing) for the recognition result data (voice text) of the driver's response voice.

For example, the analysis result generated by the response voice analysis unit 212 is fed back to the interactive voice providing unit 211. The analysis result, fed back in this way, allows the interactive voice providing unit 211 to derive a more suitable interactive voice (more interaction-like interactive voice) as the next interactive voice according to the driver's response contents.

In addition, the analysis result generated by the response voice analysis unit 212 is fed back, for example, to an appropriate processing unit of the navigation device 100 according to the question contents and the driver's response contents. For example, if the question contents are "There is a traffic jam ahead. Do you want to search for a detour route?" and the driver's response contents are "Yes", the analysis result generated by the response voice analysis unit 212 is fed back to the route search unit of the navigation device 100. The analysis result, fed back in this way, causes the route search unit of the navigation device 100 to search for a route that avoids congestion.

When the recognition result data (voice text) of a driver's response voice is received by the communication I/F 201, the state detection unit 213 uses a known method (for example, a method to detect a particular word from a voice text) to detect the state of the driver (for example, the degree of tension, the degree of stress, etc.) based on the recognition result data. The detection result detected by the state detection unit 213 is fed back, for example, to the interactive voice providing unit 211. The detection result, fed back in this way, allows the interactive voice providing unit 211 to derive a more suitable interactive voice as the next interactive voice according to the state of the driver.

The control device 210 is configured by hardware components such as a Central Processing Unit (CPU), a main storage device (for example, Read Only Memory (ROM), Random Access Memory (RAM), etc.), and an auxiliary storage device (for example, a Hard Disk Drive (HDD), flash memory, etc.). The functions of the control device 210 described above are implemented when the CPU (computer) executes a program, stored in the main storage device or the auxiliary storage device, in the control device 210.

The center server 200 may be configured physically by one information processing device or by a plurality of information processing devices. In the latter case, the plurality of information processing devices may be the devices connected to each other via a network.

(Navigation Device 100)

The navigation device 100 is a device mounted on a vehicle. The navigation device 100 has the function of a general navigation device (for example, route search function, route guidance function, etc.) as well as the function of an "awareness support device". The navigation device 100 can send and receive various types of data (interactive voice data, response voice data, recognition result data on response voice, etc.) to and from the center server 200 over wireless communication (for example, via a cellular phone network where the base station is at its end or via Wi-Fi).

As shown in FIG. 1, the navigation device 100 includes an input device 101, a display 102, a Global Positioning System (GPS) unit 103, a speaker 104, a communication I/F 105, a microphone 106, a map DB 111, a facility information DB 112, and a control device 120.

The input device 101 is a device used by a user to enter various types of information. Examples of the input device 101 include a touch panel, an operation button, and a cross key. The display 102 is a device for displaying various types of information. Examples of the display 102 include a liquid crystal display and an organic Electro Luminescence (EL) display.

The GPS unit 103 detects the current location (longitude and latitude) of the navigation device 100 based on the GPS signals received from the GPS satellites. The speaker 104 is a device that outputs various types of voice (for example, interactive voice for a driver).

The communication I/F 105 controls wireless communication with the center server 200 to send and receive various types of data to and from the center server 200. For example, the communication I/F 105 sends a request to acquire interactive voice data for the driver to the center server 200. The communication I/F 105 also receives interactive voice data for the driver provided by the center server 200 (interactive voice providing unit 211). The communication I/F 105 also sends voice recognition result data (voice text) on a driver's response voice to the center server 200.

The microphone 106, provided near the driver's seat in the vehicle, is a device for receiving a voice emitted from the driver. A microphone built in the main body of the navigation device 100 or an external microphone provided separately from the main body of the navigation device 100 may be used as the microphone 106.

The map DB 111 stores map data. The map data includes a plurality pieces of node data and a plurality pieces of link data. Node data is data corresponding to an intersection. Link data is data corresponding to a road section between one node and another node.

The facility information DB 112 stores a plurality pieces of facility information. For example, each piece of facility information includes information such as a facility name, location information (latitude and longitude), a genre, an address, a zip code, a telephone number, a detailed comment, an image, and so on.

The control device 120 is a device that implements the function of the "awareness support device". The control device 120 controls the processing on the navigation device 100 side when the awareness support service is used from the navigation device 100. As shown in FIG. 1, the control device 120 includes an information acquisition unit 121, an awareness level reduction detection unit 122, an awareness level recovery detection unit 123, an interaction processing unit 124, and an estimation processing unit 130.

The information acquisition unit 121 acquires vehicle information on a vehicle, driven by a driver, and road information on a road on which the vehicle is traveling. More specifically, the information acquisition unit 121 acquires the vehicle information and the road information used to identify the occurrence of a predetermined event for detecting a reduction in the driver's awareness level (a caution-required action (generally, an action for which a caution should be issued to the driver)) and the occurrence of a normal action for detecting a recovery from the reduced state of the driver's awareness level. Examples of the vehicle information and the road information acquired by the information acquisition unit 121 include the vehicle information and road information given below (though not limited to these vehicle information and road information). The vehicle information given below can be acquired, for example, from various vehicle-mounted Electronic Control Units (ECUs), various sensors, and so on. The road information given below can be acquired, for example, from the map DB 111.

<Example of Vehicle Information Acquired by the Information Acquisition Unit 121>

Vehicle speed signal
Accelerator pedal opening signal
Brake signal
Steering wheel angle signal
Acceleration sensor output signal
Output signal from lane departure warning system
Blinker turn-on signal
Vehicle traveling direction information
Driving time <Example of Road Information Acquired by the Information Acquisition Unit 121>
   One-way information
   Speed Limit
   Stop information
   Curve information The awareness level reduction detection unit 122 detects a reduction in the driver's awareness level based on the vehicle information and the road information acquired by the information acquisition unit 121. More specifically, based on the vehicle information and the road information acquired by the information acquisition unit 121, the awareness level reduction detection unit 122 identifies that a predetermined caution-required action related to the traveling of the vehicle has occurred. When such a predetermined caution-required action is identified, the awareness level reduction detection unit 122 decreases the score by a subtraction point associated with the identified predetermined caution-required action. This score is defined so that the awareness level reduction detection unit 122 can detect a reduction in the driver's awareness level and so that the awareness level recovery detection unit 123 can detect a recovery in the awareness level of the driver. For example, the initial value is set to "0". When the score becomes "−10" or less, the awareness level reduction detection unit 122 determines that "the driver's awareness level is reduced". An example of predetermined caution-required actions and subtraction points will be described later with reference to FIG. 3A and FIG. 3B. Details of the awareness level reduction detection processing performed by the awareness level reduction detection unit 122 will be described later with reference to FIG. 4.

The awareness level recovery detection unit 123 detects a recovery from a reduction in the driver's awareness level. That is, the awareness level recovery detection unit 123 detects that the driver's awareness level, once detected by the awareness level reduction detection unit 122 that it was in the reduced state, has recovered from the reduced state, based on the vehicle information and the road information acquired by the information acquisition unit 121. More specifically, the awareness level recovery detection unit 123 identifies that a predetermined normal action related to the traveling of the vehicle has been performed, based on the vehicle information and the road information acquired by the information acquisition unit 121. When such a predetermined normal action is performed, the awareness level recovery detection unit 123 increases the score by an addition point associated with the identified predetermined normal action. After that, if the score exceeds a predetermined threshold value (for example, "0", which is the initial value, but not limited thereto), the awareness level recovery detection unit 123 determines that "the driver's awareness level has recovered from the reduced state." An example of predetermined normal actions and addition points will be described later with reference to FIG. 7. Details of the awareness level recovery detection processing performed by the awareness level recovery detection unit 123 will be described later with reference to FIG. 8.

The interaction processing unit 124 performs voice interaction with the driver. More specifically, the interaction processing unit 124 first sends a request to acquire interactive voice data for the driver to the center server 200. By sending this request, the interaction processing unit 124 acquires interactive voice data for the driver from the center server 200. After acquiring the interactive voice data, the interaction processing unit 124 outputs an interactive voice, which is generated based on the interactive voice data, from the speaker 104. After that, the interaction processing unit 124 acquires a driver's response voice entered via the microphone 106. For the acquired response voice, the interaction processing unit 124 performs voice recognition processing to generate the voice text of the response voice. In addition, the interaction processing unit 124 sends the voice text, generated by the voice recognition processing, to the center server 200.

The interaction processing unit 124 outputs an interactive voice, which is a voice for interacting with the driver, when the awareness level reduction detection unit 122 detects a reduction in the driver's awareness level. Then, after outputting the interactive voice, the interaction processing unit 124 terminates the output of the interactive voice when the awareness level recovery detection unit 123 detects that the driver has recovered from the reduced state of the driver's awareness level.

The estimation processing unit 130 includes a response time measurement unit 131, a response time DB 132, a statistical value calculation unit 133, a specific word extraction unit 134, an estimation unit 135, and a second estimation unit 136.

The response time measurement unit 131 measures the response time required for the driver to respond to an interactive voice with a response voice. For example, the response time measurement unit 131 measures the response time from the time an interactive voice is output by the interaction processing unit 124 to the time a driver's response voice is acquired by the interaction processing unit 124. For example, the response time measurement unit 131 can measure the response time using the timer function of the navigation device 100 or based on the system time-of-day of the navigation device 100.

Each time a response time is measured by the response time measurement unit 131, it is recorded in the response time DB 132. As a result, the response time measured by the response time measurement unit 131 is accumulated in the response time DB 132 on a time series basis.

The statistical value calculation unit 133 calculates the average response time of a plurality of response times based on a plurality of response times recorded in the response time DB 132. More specifically, for each of a plurality of interactive voice groups (the first interactive voice group and the second interactive voice group in this embodiment), the statistical value calculation unit 133 calculates the average response time of the three most recent response times (but not limited to this) based on these three response times recorded in the response time DB 132.

The specific word extraction unit 134 extracts a specific word included in the driver's response voice, based on the voice text generated by the voice recognition processing performed by the interaction processing unit 124. It is preferable that a specific word extracted by the specific word extraction unit 134 indicate a reduction in the driver's awareness level. For example, the specific words include the following (but not limited thereto).
   "Sleepy"
   "Tired"
   "Boring"
   "I want to take a break"
   "Hei-ho"
   "Oh no"

The estimation unit 135 derives an estimate value of the driver's awareness level, based on the response time measured by the response time measurement unit 131 and the average response time calculated by the statistical value calculation unit 133. More specifically, when the response time measured by the response time measurement unit 131 is 1.8 times or more of the average response time calculated by the statistical value calculation unit 133, the estimation unit 135 derives an estimation value indicating that "the driver's awareness level is reduced". In this case, when the response time measured by the response time measurement unit 131 is the time of a response to a question of the first interactive voice group, the estimation unit 135 derives the estimation value of the driver's awareness level based on the average response time of the first interactive voice group calculated by the statistical value calculation unit 133. On the other hand, when the response time measured by the response time measurement unit 131 is the time of a response to a question of the second interactive voice group, the estimation unit 135 derives the estimation value of the driver's awareness level based on the average response time of the second interactive voice group calculated by the statistical value calculation unit 133.

The estimation unit 135 may derive the level value of the driver's awareness level as the estimation value, based on the response time measured by the response time measurement unit 131 and the average response time calculated by the statistical value calculation unit 133. In this case, the estimation unit 135 should make the level value of the driver's awareness level smaller as the response time, measured by the response time measurement unit 131, is greater than the average response time calculated by the statistical value calculation unit 133.

In addition, the estimation unit 135 may selectively derive an estimation value from two or more pre-defined estimation values, based on the response time measured by the response time measurement unit 131 and the average response time calculated by the statistical value calculation unit 133. In this case, the estimation unit 135 should select an estimation value indicating that the driver's awareness level is lower as the response time, measured by the response time measurement unit 131, is larger than the average response time calculated by the statistical value calculation unit 133.

The second estimation unit 136 derives the estimation value of the driver's awareness level, based on the extraction result of a specific word extracted by the specific word extraction unit 134. More specifically, the second estimation unit 136 derives an estimation value indicating that "driver's awareness level is reduced" when the specific word extraction unit 134 extracts a specific word more than a predetermined number of times (for example, two or more times in the past 15 minutes) from the response voice.

The second estimation unit 136 may derive the level value of the driver's awareness level as the estimation value based on the extraction result of a specific word extracted by the specific word extraction unit 134. In this case, the second estimation unit 136 should make the level value of the driver's awareness level smaller as the number of specific words extracted by the specific word extraction unit 134 is larger.

In addition, the second estimation unit 136 may selectively derive an estimation value from two or more pre-defined estimation values, based on the extraction result of a specific word extracted by the specific word extraction unit 134. In this case, the second estimation unit 136 should select an estimation value indicating that the driver's awareness level is lower as the number of specific words extracted by the specific word extraction unit 134 is larger.

The control device 120 outputs the estimation value of the driver's awareness level, derived by the estimation unit 135, and the estimation value of the driver's awareness level, derived by the second estimation unit 136, to various processing units that require these estimation values. The control device 120 may output these two estimates separately. Alternatively, the control device 120 may perform a predetermined calculation based on these two estimation values to calculate an estimation value for output and then output this estimation value for output.

The control device 120 includes hardware components such as a CPU, a main storage device (for example, ROM, RAM, etc.), and an auxiliary storage device (for example, HDD, flash memory, etc.). Each function of the control device 120 shown in FIG. 1 is implemented in the control device 120 by the CPU (computer) that executes a program stored in the main storage device or the auxiliary storage device.

A program executed by the CPU may be installed in advance in the navigation device 100 or may be installed in the navigation device 100 from the outside. In the latter case, the program may be provided by an external storage medium (for example, a USB memory, a memory card, a CD-ROM, etc.) or may be provided by downloading it from a server on a network (for example, the Internet).

(Procedure of Processing Performed by the Control Device 120 of the Navigation Device 100)

Figure 2:
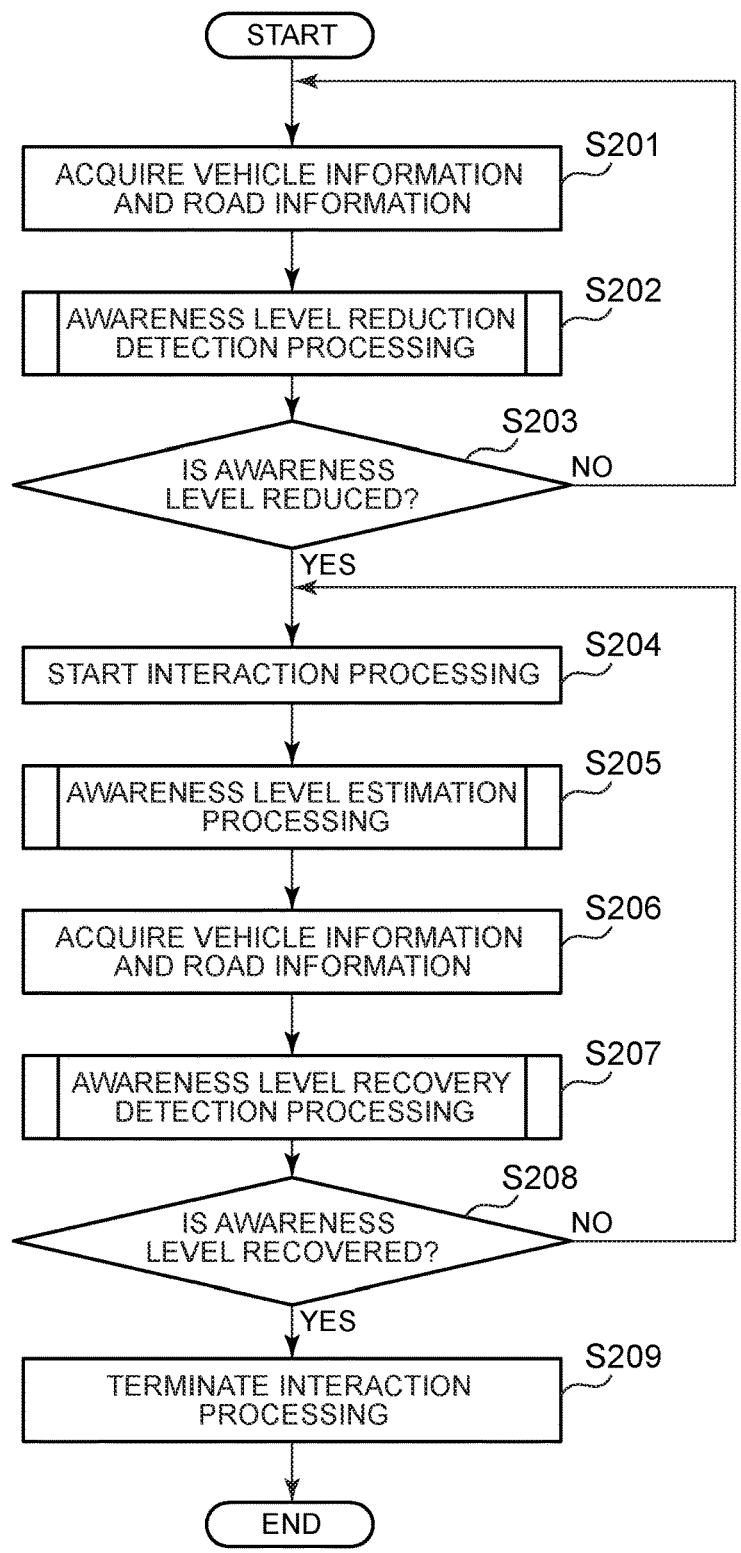
FIG. 2 is a flowchart showing a procedure of processing performed by a control device of a navigation device according to the embodiment.

FIG. 2 is a flowchart showing a procedure of the processing performed by the control device 120 of the navigation device 100 according to the embodiment. The processing shown in FIG. 2 is performed repeatedly by the navigation device 100 while the vehicle travels.

First, the information acquisition unit 121 acquires the vehicle information on the vehicle driven by a driver and the road information on the road on which the vehicle is traveling (step S201). Next, the awareness level reduction detection unit 122 performs the awareness level reduction detection processing for detecting whether the driver's awareness level is reduced, based on the vehicle information and the road information acquired in step S201 (step S202). The detail of the awareness level reduction detection processing performed by the awareness level reduction detection unit 122 will be described later with reference to FIG. 3A, FIG. 3B, and FIG. 4.

If a reduction in the driver's awareness level is not detected in the awareness level reduction detection processing in step S202 (step S203: No), the control device 120 returns the processing to step S201. On the other hand, if a reduction in the driver's awareness level is detected in the awareness level reduction detection processing in step S202 (step S203: Yes), the interaction processing unit 124 outputs an interactive voice that is a voice used for interaction with the driver (step S204). The detail of the interaction processing performed by the interaction processing unit 124 will be described later with reference to FIG. 5.

Next, the estimation processing unit 130 performs the awareness level estimation processing for estimating the driver's awareness level (step S205). The detail of the awareness level estimation processing performed by the estimation processing unit 130 will be described later with reference to FIG. 6.

The information acquisition unit 121 acquires the vehicle information on the vehicle, driven by the driver, and the road information on the road on which the vehicle is traveling (step S206). After that, the awareness level recovery detection unit 123 performs the awareness level recovery detection processing for detecting a recovery from the reduced state of the driver's awareness level, based on the vehicle information and the road information acquired in step S206 (step S207). The detail of the awareness level recovery detection processing performed by the awareness level recovery detection unit 123 will be described later with reference to FIG. 7 and FIG. 8.

If a recovery from the reduced state of the driver's awareness level is not detected in the awareness level recovery detection processing in step S207 (step S208: No), the control device 120 returns the processing to step S204. On the other hand, if a recovery from the reduced state of the driver's awareness level is detected in the awareness level recovery detection processing in step S207 (step S208: Yes), the interaction processing unit 124 terminates the output of the interactive voice (step S209). Then, the control device 120 terminates the series of processing shown in FIG. 2.

(An Example of Tables Referenced by the Awareness Level Reduction Detection Unit 122)

FIG. 3A and FIG. 3B are diagrams showing an example of tables referenced by the navigation device 100 (awareness level reduction detection unit 122) according to the embodiment. In a table 300 shown in FIG. 3A, a subtraction point is set for each predetermined caution-required action related to the traveling of a vehicle. In a table 310 shown in FIG. 3B, a coefficient to be multiplied by a subtraction point is set for each elapsed time from the time a predetermined caution-required action has occurred. These tables, 300 and 310, are stored in advance, for example, in the memory of the control device 120. These tables, 300 and 310, are referenced by the awareness level reduction detection unit 122 of the navigation device 100 when a reduction in driver's awareness level is detected.

(Procedure of the Awareness Level Reduction Detection Processing)

FIG. 4 is a flowchart showing the procedure of the awareness level reduction detection processing performed by the navigation device 100 (the awareness level reduction detection unit 122) according to the embodiment. FIG. 4 is a flowchart showing, in detail, the processing contents of the awareness level reduction detection processing (step S202) in the flowchart shown in FIG. 2.

First, the awareness level reduction detection unit 122 identifies whether one of the caution-required actions shown in the table 300 has occurred, based on the vehicle information and the road information acquired by the information acquisition unit 121 (step S401).

For example, the awareness level reduction detection unit 122 can identify that "sudden braking (ordinary road)" has occurred, based on the vehicle speed signal, the brake signal, the acceleration sensor output signal, and so on. The awareness level reduction detection unit 122 can also identify that "sudden braking (when turning right/left)" has occurred, based on the vehicle speed signal, the brake signal, the acceleration sensor output signal, the steering wheel angle signal, and so on.

The awareness level reduction detection unit 122 can also identify that "sudden steering" has occurred, based on the steering wheel angle signal and so on. The awareness level reduction detection unit 122 can also identify that "lane departure (once)" has occurred, based on the output signal and so on from the lane departure warning system.

The awareness level reduction detection unit 122 can also identify that a "failure to stop at stop line" has occurred, based on the stop information, the brake signal, the vehicle speed signal, and so on. The awareness level reduction detection unit 122 can also identify that a "drive in the wrong direction" has occurred, based on the one-way information, the vehicle traveling direction information, and so on.

The awareness level reduction detection unit 122 can also identify that "traveling straight ahead for 30 seconds or more with right/left turn lamp on" has occurred, based on the blinker turn-on signal, the steering wheel angle signal, the vehicle speed signal, and so on. The awareness level reduction detection unit 122 can also identify that "traveling for 30 seconds or more with hazard lamp on" has occurred, based on the blinker turn-on signal, the vehicle speed signal, and so on.

If it is not identified in step S401 that any caution-required action has occurred (step S401: No), the awareness level reduction detection unit 122 terminates the series of processing shown in FIG. 4. On the other hand, if it is identified in step S401 that one of the caution-required actions has occurred (step S401: Yes), the awareness level reduction detection unit 122 references the table 300 in FIG. 3A to identify the subtraction point associated with the caution-required action identified in step S401 (step S402). For example, when the identified caution-required action is "sudden braking (ordinary road)", the awareness level reduction detection unit 122 identifies "−4 points" as the subtraction point from the table 300. Similarly, when the identified caution-required action is "sudden braking (when turning right/left)", the awareness level reduction detection unit 122 identifies "−8 points" as the subtraction point from the table 300.

In addition, the awareness level reduction detection unit 122 identifies the elapsed time from the occurrence time of the caution-required action identified in step S401 (step S403). The awareness level reduction detection unit 122 references the table 310 in FIG. 3B to identify the coefficient associated with the elapsed time identified in step S403 (step S404). The awareness level reduction detection unit 122 multiplies the subtraction point, identified in step S402, by the coefficient identified in step S404 (step S405). For example, when the elapsed time, identified in step S403, corresponds to "5 minutes elapsed", the awareness level reduction detection unit 122 identifies "0.9" as the coefficient from the table 310 and multiplies the subtraction point, identified in step S402, by the coefficient. Similarly, when the elapsed time, identified in step S403, corresponds to "8 minutes elapsed", the awareness level reduction detection unit 122 acquires "0.7" as the coefficient from the table 310 and multiples the subtraction point, identified in step S402, by the coefficient.

After that, the awareness level reduction detection unit 122 subtracts the subtraction point, generated by the multiplication of the coefficient in step S405, from the score (initial value=0) (step S406). Furthermore, the awareness level reduction detection unit 122 determines whether the score is equal to or less than "−10" after the subtraction in step S406 (step S407).

If it is determined in step S407 that the score is not equal to or less than "−10" (step S407: No), the awareness level reduction detection unit 122 terminates the series of processing shown in FIG. 4. On the other hand, if it is determined in step S407 that the score is equal to or less than "−10" (step S407: Yes), the awareness level reduction detection unit 122 determines that "the driver's awareness level is reduced" (step S408). Then, the awareness level reduction detection unit 122 terminates the series of processing shown in FIG. 4.

(Procedure of the Interaction Processing)

FIG. 5 is a sequence diagram showing the procedure of the interaction processing performed by the navigation device 100 (interaction processing unit 124) and the center server 200 according to the embodiment. FIG. 5 shows, in detail, the processing contents of the interaction processing started in the flowchart (step S204) shown in FIG. 2.

First, in the navigation device 100, the interaction processing unit 124 sends a request to acquire interactive voice data for the driver to the center server 200 via the communication I/F 105 (step S501).

In the center server 200, when the communication I/F 201 receives the acquisition request sent from the navigation device 100 (step S502), the interactive voice providing unit 211 provides interactive voice data for the driver (step S503). Then, the interactive voice providing unit 211 sends the interactive voice data, provided in step S503, to the navigation device 100 via the communication I/F 201 (step S504).

In the navigation device 100, when the communication I/F 105 receives the interactive voice data sent from the center server 200 (step S505), the interaction processing unit 124 outputs an interactive voice, generated based on the interactive voice data, to the speaker 104 (step S506).

After that, when the interaction processing unit 124 acquires a driver's response voice entered from the microphone 106 (step S507), the interaction processing unit 124 performs the voice recognition processing for the response voice so that the voice text of the response voice is generated (step S508). Furthermore, the interaction processing unit 124 sends the voice text, generated in step S508, to the center server 200 (step S509).

In the center server 200, when the communication I/F 201 receives the voice text sent from the navigation device 100 (step S510), the response voice analysis unit 212 analyzes the voice text (step S511). In addition, the state detection unit 213 detects the driver's state based on the voice text (step S512).

In the processing shown in FIG. 5, the center server 200 may feedback the result of the analysis processing, performed in step S511, and the driver's state, detected in step S512, to the interactive voice providing unit 211. The analysis result and the driver's state, fed back in this way, allows the interactive voice providing unit 211 to provide an interactive voice according to the driver's response contents and the driver's state next time an interactive voice is provided, (Procedure of the Awareness Level Estimation Processing)

Figure 6:
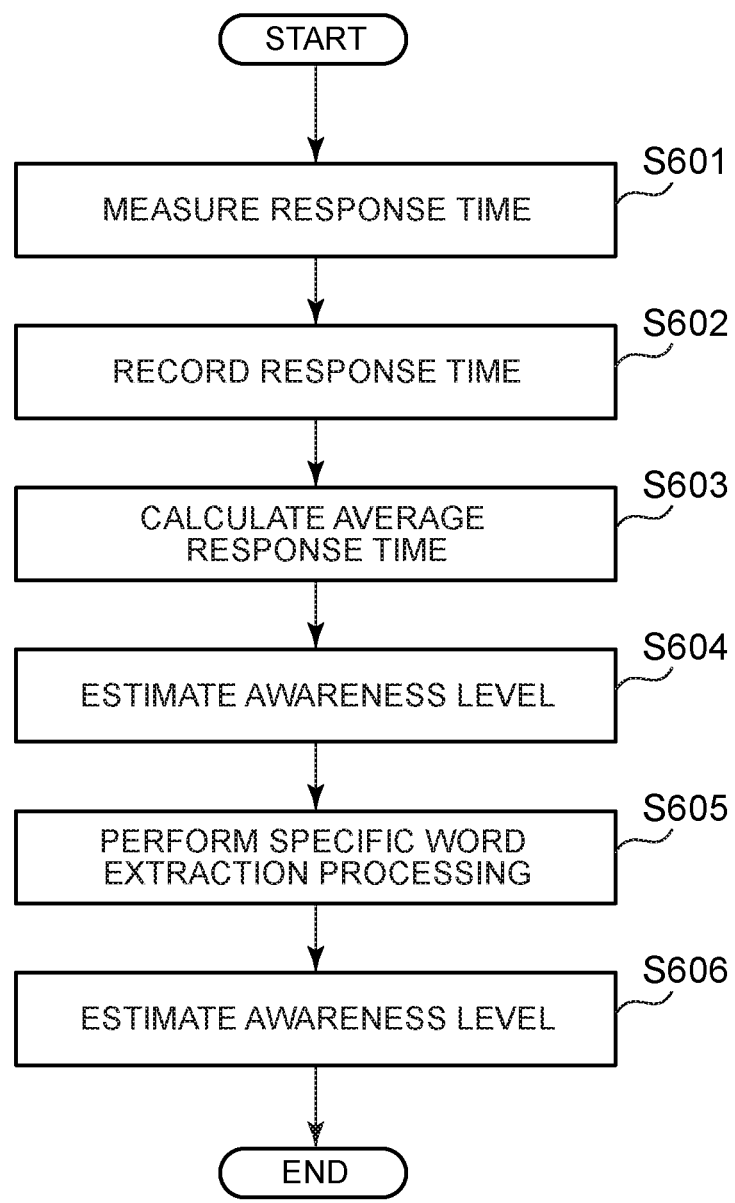
FIG. 6 is a flowchart showing a procedure of the awareness level estimation processing performed by the navigation device (estimation processing unit) according to the embodiment.

FIG. 6 is a flowchart showing a procedure of the awareness level estimation processing performed by the navigation device 100 (estimation processing unit 130) according to the embodiment. FIG. 6 is a diagram showing, in detail, the processing contents of the awareness level estimation processing (step S205) included in the flowchart in FIG. 2.

First, the response time measurement unit 131 calculates the response time (response time from the time the interactive voice for the driver is output to the time the driver's response voice is acquired) in the interaction processing performed by the interaction processing unit 124 (step S601). Then, the response time measurement unit 131 records the response time, measured in step S601, in the response time DB 132 (step S602).

In addition, the statistical value calculation unit 133 calculates the average response time of a plurality of response times (step S603) based on the plurality of response times recorded in the response time DB 132. After that, the estimation unit 135 derives an estimation value of the driver's awareness level (step S604) based on the response time, measured in step S601, and the average response time calculated in step S603.

Furthermore, the specific word extraction unit 134 extracts a specific word included in the driver's response voice (step S605), based on the voice recognition processing result (voice text) of the driver's response voice generated in the interaction processing performed by the interaction processing unit 124. Then, the second estimation unit 136 derives an estimation value of the driver's awareness level (step S606) based on the result of the extraction processing performed in step S605. After that, the estimation processing unit 130 terminates the series of processes shown in FIG. 6.

(Example of a Table Referenced by the Awareness Level Recovery Detection Unit 123)

FIG. 7 is a diagram showing an example of a table referenced by the navigation device 100 (awareness level recovery detection unit 123) according to the embodiment. In the table 700 shown in FIG. 7, an addition point is set for each predetermined normal action related to the traveling of the vehicle. This table 700 is stored, for example, in the memory of the control device 120 in advance. The table 700 is referenced by the awareness level recovery detection unit 123 of the navigation device 100 when a recovery from the reduced state of the driver's awareness level is detected.

(Procedure of the Awareness Level Recovery Detection Processing)

Figure 8:
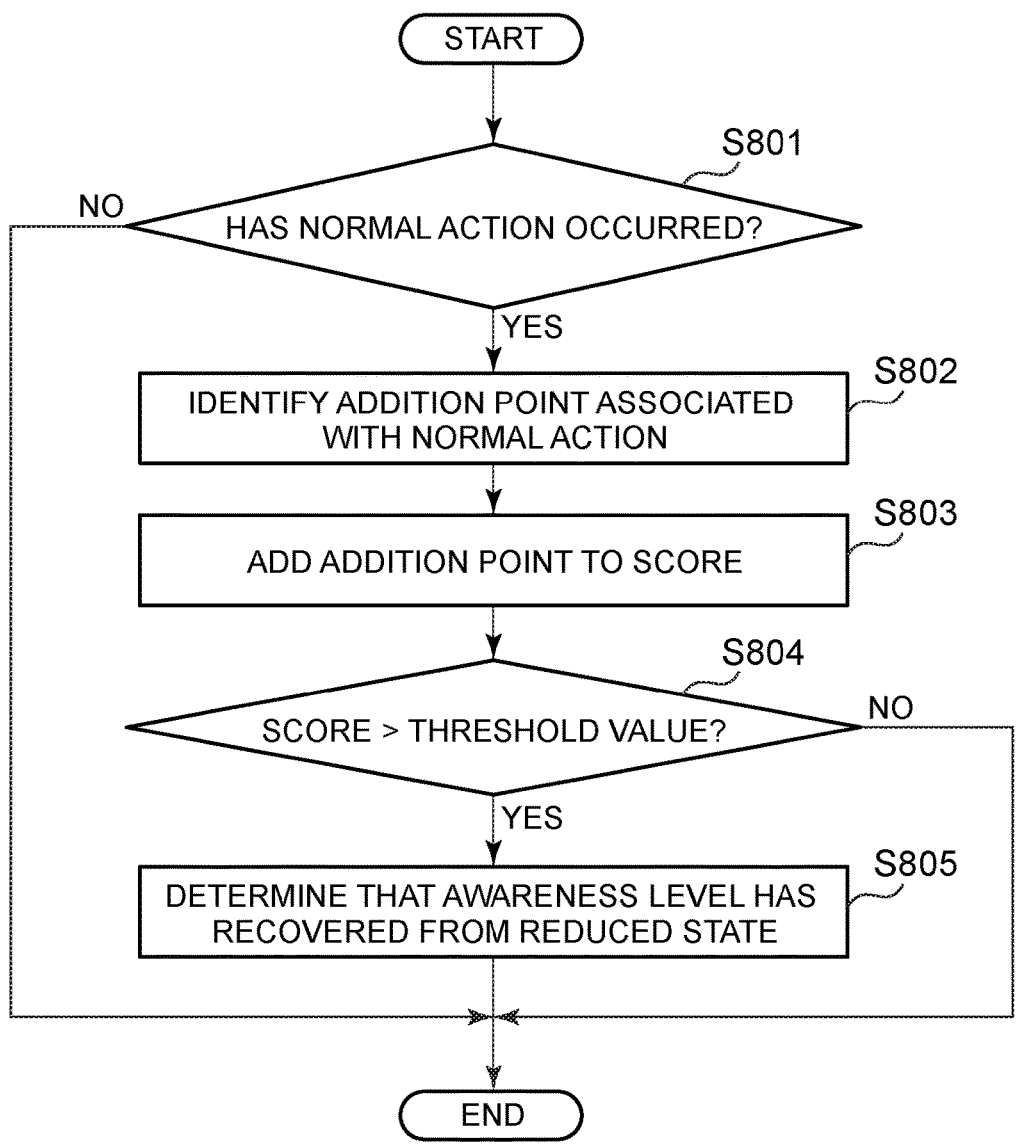
FIG. 8 is a flowchart showing a procedure of the awareness level recovery detection processing performed by the navigation device (awareness level recovery detection unit) according to the embodiment.

FIG. 8 is a flowchart showing a procedure of the awareness level recovery detection processing performed by the navigation device 100 (the awareness level recovery detection unit 123) according to the embodiment. FIG. 8 is a flowchart showing, in detail, the processing contents of the awareness level recovery detection processing (step S207) included in the flowchart in FIG. 2.

First, the awareness level recovery detection unit 123 identifies whether one of the normal actions shown in the table 700 has occurred, based on the vehicle information and the road information acquired by the information acquisition unit 121 (step S801).

For example, the awareness level recovery detection unit 123 can identify that a "slow deceleration action" has occurred, based on the vehicle speed signal, the brake signal, the acceleration sensor output signal, and so on. The awareness level recovery detection unit 123 can also identify that "a normal right/left turn with the right/left turn lamp on" has occurred, based on the blinker turn-on signal, the steering wheel angle signal, the vehicle speed signal, and so on. The awareness level recovery detection unit 123 can also identify that "no lane departure for a certain period" has occurred, based on the output signal from the lane departure warning system and so on.

If it is not identified in step S801 that any normal action has occurred (step S801: No), the awareness level recovery detection unit 123 terminates the series of processing shown in FIG. 8. On the other hand, if it is identified in step S801 that one of the normal actions has occurred (step S801: Yes), the awareness level recovery detection unit 123 references the table 700 in FIG. 7 to identify the addition point associated with the normal action identified in step S801 (step S802). For example, when the identified normal action is a "slow deceleration action", the awareness level recovery detection unit 123 identifies "+1 point" as the addition point from the table 700.

After that, the awareness level recovery detection unit 123 adds the addition point, identified in step S802, to the score (step S803). Furthermore, the awareness level recovery detection unit 123 determines whether the score has exceeded the predetermined threshold value as a result of the addition in step S803 (step S804).

If it is determined in step S804 that the score has not exceeded the predetermined threshold value (step S804: No), the awareness level recovery detection unit 123 terminates the series of processing shown in FIG. 8. On the other hand, if it is determined in step S804 that the score has exceeded the predetermined threshold value (step S804: Yes), the awareness level recovery detection unit 123 determines that "the driver's awareness level has recovered from the reduced state" (step S805). Then, the awareness level recovery detection unit 123 terminates the series of processing shown in FIG. 8.

As described above, according to the navigation device 100 in this embodiment, the response time required for the driver to respond to an interactive voice with a response voice is measured and, based on the measured response time and the statistical value calculated based on the history of the response times, the estimation value of the driver's awareness level can be derived. This configuration allows the estimation value of the driver's awareness level to be derived based on the statistical value calculated based on the past response times of the driver himself. The past response times of the driver himself are values reflecting accurately the individual differences that vary widely from person to person when the driver responds to a question. Therefore, the navigation device 100 according to this embodiment can accurately estimate the driver's awareness level.

According to the navigation device 100 in this embodiment, the estimation value of the driver's awareness level can be derived based on the extraction result of a specific word included in a response voice from the driver. This configuration allows the driver's awareness level to be estimated from the contents of a response voice actually emitted by the driver. The contents of a response voice emitted from the driver are the contents that the driver himself accurately represents the driver's current state (awareness level). Therefore, the navigation device 100 according to this embodiment can accurately estimate the driver's awareness level.

According to the navigation device 100 in this embodiment, an interactive voice belonging to one of the plurality of interactive voice groups is output to the driver. In this case, based on the history of the response times calculated when an interactive voice belonging to that one of the interactive voice group was output to the driver in the past, the statistical value of the response times can be calculated. This configuration allows the estimation value of the driver's awareness level to be derived based on the statistical value calculated based on the appropriate past response times according to the contents of a question. Therefore, the navigation device 100 according to this embodiment can accurately estimate the driver's awareness level.

According to the navigation device 100 in this embodiment, an interactive voice, which is a voice used for interaction with the driver, is output when a reduction in the driver's awareness level is detected based on vehicle information. In this case, when a recovery from reduced state of the driver's awareness level is detected after the interactive voice is output, the output of the interactive voice can be ended. This configuration allows the interaction with the driver to be performed while the driver's awareness level is actually reduced. Therefore, the navigation device 100 according to this embodiment can appropriately adjust the period of interaction with the driver according to the driver's state.

According to the navigation device 100 in this embodiment, each time the occurrence of a predetermined caution-required action is identified based on the vehicle information, the point associated with the predetermined caution-required action is subtracted from the score and, when the score becomes equal to or less than the predetermined threshold value, a reduction in the driver's awareness level can be detected. This configuration allows the interaction with the driver to be started when a predetermined caution-required action repeatedly occurs while the driver drives the vehicle. A predetermined caution-required action mentioned here can occur in the state in which the driver's awareness level is reduced. Therefore, the navigation device 100 according to this embodiment can appropriately adjust the start timing of the interaction with the driver according to the driver's state.

According to the navigation device 100 according to this embodiment, each time a predetermined normal action is identified based on the vehicle information, the point associated with the predetermined normal action is added to the score and, when the score exceeds the predetermined threshold value, a recovery from the reduced state of the driver's awareness level can be detected. This configuration allows the interaction with the driver to be ended when a predetermined normal action repeatedly occurs while the driver drives the vehicle. A predetermined normal action mentioned here can occur in the state in which the driver's awareness level is recovered. Therefore, the navigation device 100 according to this embodiment can appropriately adjust the end timing of the interaction with the driver according to the driver's state.

While the preferred embodiment of the present disclosure has been described above in detail, it is to be understood that the present disclosure is not limited to the embodiment above but that various modifications and changes may be added within the scope of the present disclosure described in claims.

For example, in the embodiment, a part of the functions provided in the center server 200 (for example, the response voice analysis function) may be provided in the navigation device 100 or another information processing device.

Similarly, in the embodiment, a part of the functions provided in the navigation device 100 may be provided in the center server 200 or another information processing device. For example, the interaction processing unit 124 may be provided in the center server 200 or another information processing device. In this case, the interaction processing unit 124 outputs interactive voice data, which is a question-form interactive voice, to the navigation device 100 to cause the speaker 104 of the navigation device 100 to output an interactive voice based on the interactive voice data. When a driver's response voice responsive to the interactive voice is entered from the microphone 106 of the navigation device 100, the interaction processing unit 124 acquires response voice data, which represents the response voice, from the navigation device 100.

In the embodiment, though the navigation device 100 is used as an example of the "awareness support device", other information processing devices (for example, in-vehicle audio device, smartphone, tablet terminal, etc.) may also be used to implement the function of the "awareness support device".

What is claimed is:
1. An awareness support device comprising:
a processor programmed to:
  detect a reduction in a driver's awareness level based on vehicle information on a vehicle driven by the driver;
  subtract a point associated with a predetermined caution-required action from a score each time an occurrence of the predetermined caution-required action related to a travel of the vehicle is identified based on the vehicle information;

detect the reduction in the driver's awareness level when the score becomes equal to or less than a predetermined threshold value;

detect a recovery from the reduction in the driver's awareness level based on the vehicle information:

start an output of an interactive voice used for interaction with the driver when the reduction in the driver's awareness level is detected; and terminate the output of the interactive voice when the recovery from the reduction in the driver's awareness level is detected.

2. The awareness support device according to claim 1, wherein:

the processor is further programmed to:

add a point associated with a predetermined normal action to the score each time an occurrence of the predetermined normal action related to the travel of the vehicle is identified based on the vehicle information; and detect the recovery from the reduction in the driver's awareness level when the score becomes greater than a predetermined threshold value.

3. An awareness support method comprising:

detecting a reduction in a driver's awareness level based on vehicle information on a vehicle driven by the driver;

subtracting a point associated with a predetermined caution-required action from a score each time an occurrence of the predetermined caution-required action related to a travel of the vehicle is identified based on the vehicle information;

detecting the reduction in the driver's awareness level when the score becomes equal to or less than a predetermined threshold value;

starting an output of an interactive voice when the reduction in the driver's awareness level is detected, the interactive voice being a voice used for interaction with the driver;

detecting a recovery from the reduction in the driver's awareness level based on the vehicle information; and terminating the output of the interactive voice when the recovery from the reduction in the driver's awareness level is detected.

4. An awareness support device comprising:

an Electronic Control Unit configured to detect a reduction in a driver's awareness level based on vehicle information on a vehicle driven by the driver;

subtract a point associated with a predetermined caution-required action from a score each time an occurrence of the predetermined caution-required action related to a travel of the vehicle is identified based on the vehicle information;

detect the reduction in the driver's awareness level when the score becomes equal to or less than a predetermined threshold value;

start an output of an interactive voice when the reduction in the driver's awareness level is detected, the interactive voice being a voice used for interaction with the driver;

detect a recovery from the reduction in the driver's awareness level based on the vehicle information; and terminate the output of the interactive voice when the recovery from the reduction in the driver's awareness level is detected.

* * * * *